United States Patent
Torii

(10) Patent No.: US 6,787,953 B2
(45) Date of Patent: Sep. 7, 2004

(54) MOTOR HAVING CIRCUIT BOARD

(75) Inventor: Katsuhiko Torii, Kosai (JP)

(73) Assignee: Asmo Co., LTD, Shizuoka (JP)

( * ) Notice: Subject to any disclaimer, the term of this patent is extended or adjusted under 35 U.S.C. 154(b) by 0 days.

(21) Appl. No.: 10/673,291

(22) Filed: Sep. 30, 2003

(65) Prior Publication Data
US 2004/0066111 A1 Apr. 8, 2004

(30) Foreign Application Priority Data
Oct. 8, 2002 (JP) ......................... 2002-295013

(51) Int. Cl.$^7$ .................................... H02K 11/00
(52) U.S. Cl. ................................ 310/71; 310/83
(58) Field of Search ..................... 310/71, 83, 89

(56) References Cited

U.S. PATENT DOCUMENTS 6,459,183 B1 * 10/2002 Tasch et al. ............... 310/89
6,710,484 B2 * 3/2004 Kitoh et al. ............... 310/83

FOREIGN PATENT DOCUMENTS

| JP | 2001-268842 | * 9/2001 |
| JP | 2002-262516 | 9/2002 |

* cited by examiner

Primary Examiner—Dang Le
Assistant Examiner—Nguyen Hanh
(74) Attorney, Agent, or Firm—Posz & Bethards, PLC

(57) ABSTRACT

A motor main body includes a brush holder, which supports a plurality of power supply brushes and includes a motor-side connector to be connected with an external connector. A circuit board is installed to the brush holder in a direction perpendicular to an axial direction of a rotatable shaft to electrically connect between the motor-side connector and the power supply brushes. The circuit board is received in the circuit board receiving portion when the motor main body and a speed reducing unit are assembled together to form an electric motor.

9 Claims, 4 Drawing Sheets

MOTOR HAVING CIRCUIT BOARD

CROSS REFERENCE TO RELATED APPLICATION

This application is based on and incorporates herein by reference Japanese Patent Application No. 2002-295013 filed on Oct. 8, 2002.

BACKGROUND OF THE INVENTION

1. Field of the Invention

The present invention relates to a motor, which has a speed reducing mechanism and a circuit board received in a gear housing.

2. Description of Related Art

A motor, which has a circuit board received in a housing is disclosed in, for example, Unexamined Japanese Patent Publication No. 2002-262516.

The motor disclosed in this publication includes a motor main body and a speed reducing unit, which are connected together. The speed reducing unit includes a speed reducing mechanism. The motor main body includes an armature, which is rotatably received in a yoke housing. A brush holder is installed to an opening of the yoke housing. The brush holder holds power supply brushes, which are in sliding engagement with a commutator of the armature.

The speed reducing unit includes a gear housing, which is made of a resin material. The gear housing includes a wheel receiving portion, a circuit board receiving portion and a connector case. The wheel receiving portion receives a worm wheel, which constitutes a part of the speed reducing mechanism that reduces rotational sped of a rotatable shaft of the motor main body. The circuit board receiving portion receives the circuit board, which has a circuit that drives and controls the motor. The connector case is connected with the circuit board receiving portion in an axial direction of the rotatable shaft. The circuit board includes a connector main body, which has terminals. Furthermore, the circuit board is installed to the brush holder in the axial direction of the rotatable shaft to establish electrical connection with the brushes. When the motor main body is installed to the gear housing in the axial direction of the rotatable shaft, the circuit board is installed into the circuit board receiving portion in the axial direction of the rotatable shaft, so that there is formed a motor-side connector to be connected with the external connector.

However, in the above motor, when the connecting direction (i.e., the inserting direction) of the motor-side connector relative to the external connector needs to be changed due to a change in the corresponding design specification, a shape of the gear housing, in which the connector case is integrally formed, needs to be changed or modified. Such a modification of the shape of the gear housing generally has significant influences on the arrangement of the components received in the gear housing, so that such a modification of the shape of the gear housing cannot be achieved easily. To address such a disadvantage, it is conceivable to arrange the motor-side connector separately from the gear housing. Furthermore, in such a case, the inserting direction of the circuit board relative to the brush holder, which is positioned between the motor-side connector and the brush holder (the brushes), needs to be optimized. Also, it has been demanded to minimize manufacturing costs of the motor by addressing the above disadvantages.

SUMMARY OF THE INVENTION

The present invention addresses the above disadvantages. Thus, it is an objective of the present invention to provide a motor, which has an optimized position of a motor-side connector and an optimized installing direction of the circuit board and is capable of minimizing manufacturing costs of the motor.

To achieve the objective of the present invention, there is provided an electric motor including a motor main body, a speed reducing unit and a circuit board. The motor main body includes a rotatable shaft, which is rotated upon energization of the motor main body. The speed reducing unit is connected to the motor main body and includes a speed reducing mechanism and a gear housing. The speed reducing mechanism reduces rotational speed of the rotatable shaft. The gear housing receives the speed reducing mechanism. The circuit board is held in the gear housing and has a circuit, which controls rotation of the rotatable shaft of the motor main body. The gear housing includes a circuit board receiving portion, which opens toward the motor main body and receives the circuit board. The motor main body further includes a brush holder, which supports a plurality of power supply brushes and includes a motor-side connector to be connected with an external connector. The motor-side connector is integrated into the brush holder. The circuit board is installed to the brush holder in a direction perpendicular to an axial direction of the rotatable shaft to electrically connect between the motor-side connector and the power supply brushes. The circuit board is received in the circuit board receiving portion when the motor main body and the speed reducing unit are assembled together.

To achieve the objective of the present invention, there is also provided an electric motor including a motor main body, a speed reducing unit and a circuit board. The motor main body includes a rotatable shaft, which is rotated upon energization of the motor main body. The speed reducing unit is connected to the motor main body and includes a speed reducing mechanism and a gear housing. The speed reducing mechanism reduces rotational speed of the rotatable shaft. The gear housing receives the speed reducing mechanism. The circuit board is held in the gear housing and has a circuit, which controls rotation of the rotatable shaft of the motor main body. The gear housing includes a circuit board receiving portion, which opens toward the motor main body and receives the circuit board. The motor main body further includes a brush holder, which supports a plurality of power supply brushes and includes a connector case. The connector case is integrated into the brush holder. The circuit board includes a connector main body, which cooperates with the connector case of the brush holder to form a motor-side connector to be connected with an external connector. The circuit board is installed to the brush holder in a direction perpendicular to an axial direction of the rotatable shaft to electrically connect between the motor-side connector and the power supply brushes. The connector main body is inserted into the connector case in the direction perpendicular to the axial direction of the rotatable shaft to form the motor-side connector. The circuit board is received in the circuit board receiving portion when the motor main body and the speed reducing unit are assembled together.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A first embodiment of the present invention will be described with reference to the accompanying drawings.

Figure 1:
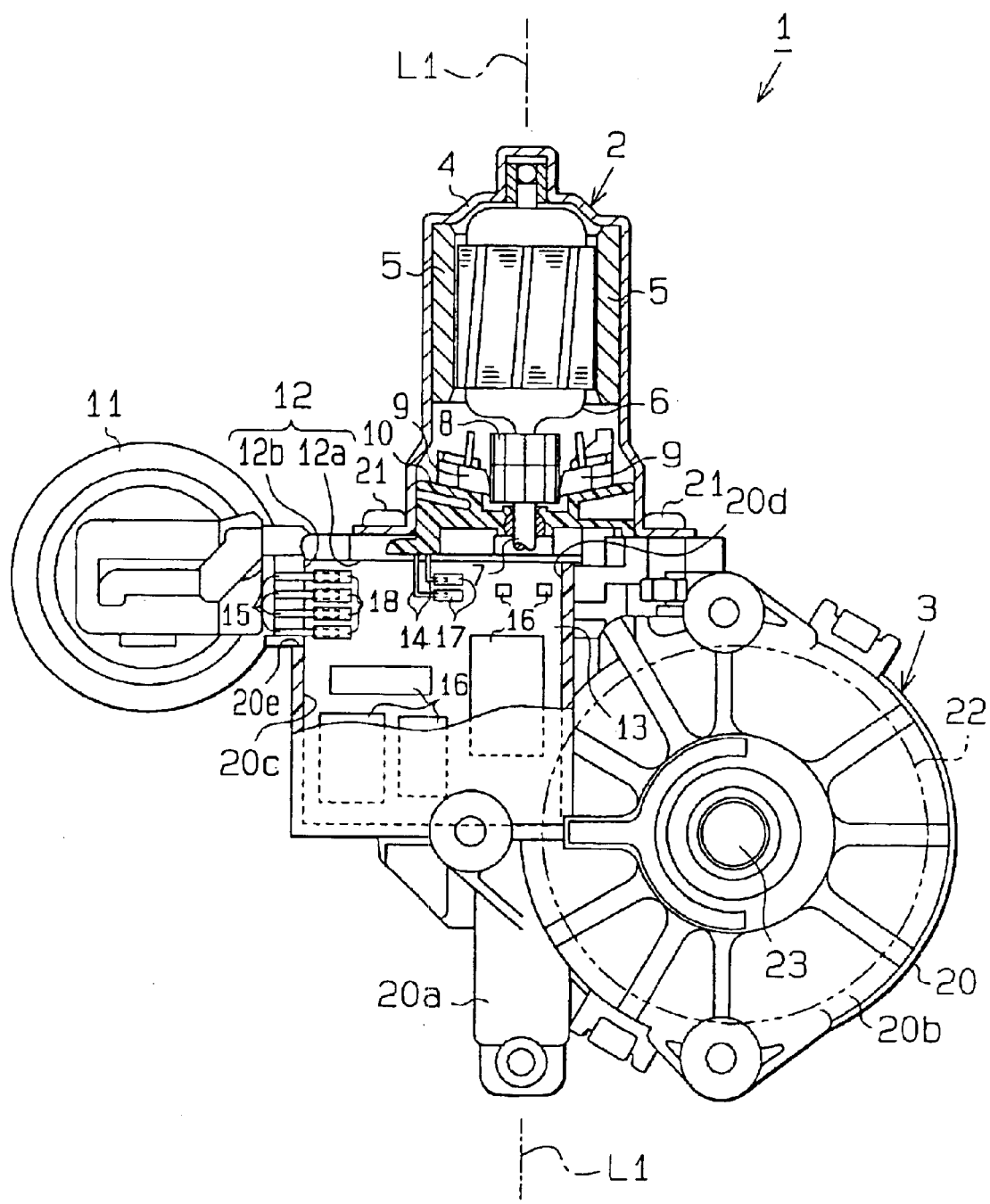
FIG. 1 is a partially fragmented frontal view of a motor according to a first embodiment of the present invention.
Figure 2:
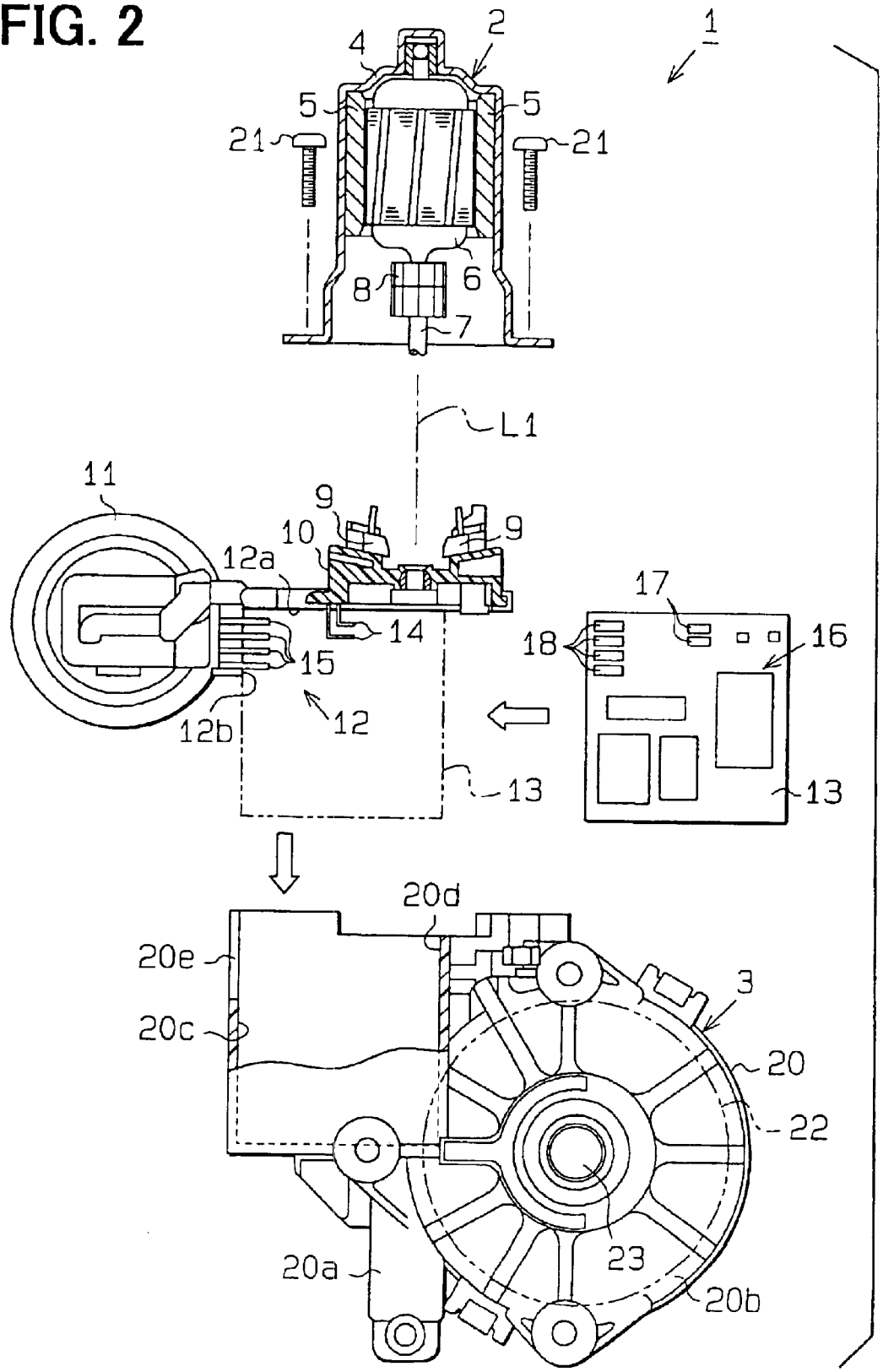
FIG. 2 is a partially fragmented and exploded frontal view of the motor of the first embodiment.

FIGS. 1 and 2 show an electric motor 1 according to the first embodiment. The motor 1 is used as a drive source of a vehicle power window system and is installed to a vehicle door (not shown). The motor 1 includes a motor main body 2 and a speed reducing unit 3. The speed reducing unit 3 includes a speed reducing mechanism to reduce rotational speed of the motor main body 2.

The motor main body 2 is constructed as a direct current motor. The motor main body 2 includes a cup shaped yoke housing 4. Two magnets 5 are secured to an inner peripheral surface of the yoke housing 4. An armature 6 is rotatably received in the yoke housing 4 at radially inward of the magnets 5. The armature 6 includes a rotatable shaft 7, and a distal end of the rotatable shaft 7 is received in the speed reducing unit 3. A commutator 8 is secured to the rotatable shaft 7. Two power supply brushes 9 are slidably engaged with the commutator 8. The power supply brushes 9 are supported by a brush holder 10. The brush holder 10 is made of a resin material. A motor-side connector 11 is integrally formed with the brush holder 10 such that the motor-side connector 11 projects radially outward from the motor 1. The motor-side connector 11 is connectable to an external connector (not shown), which supplies electric current to the motor 1 and/or conducts electric signals to and from the motor 1. A plurality of terminals (not shown) is secured to the motor-side connector 11 by insert molding.

A circuit board holding portion 12 is also formed in the brush holder 10 to position and hold the circuit board 13. The circuit board holding portion 12 includes a holder-side holding surface 12a and a connector side holding surface 12b. The holder-side holding surface 12a extends in a direction perpendicular to an axis (or axial direction) L1 of the rotatable shaft 7 at the brush holder 10 side of the circuit board holding portion 12. The connector-side holding surface 12b extends in a direction parallel to the axis L1 at the connector 11 side of the circuit board holding portion 12. That is, the holder-side holding surface 12a is angled 90 degrees relative to the connector-side holding surface 12b. These holding surfaces 12a, 12b are engaged with a corner of the circuit board 13, which has a rectangular shape, to position the circuit board 13 in place.

Brush power supply terminals 14 are secured to the brush holder 10 by insert molding. The brush power supply terminals 14 are electrically connected to the brushes 9 at one ends and are projected from the holder-side holding surface 12a at the other ends. The brush power supply terminals 14 project from the holder-side holding surface 12a in a direction parallel to the axis L1, and the distal ends of the brush power supply terminals 14 are bent in a direction, which is away from the motor-side connector 11 and is perpendicular to the axis L1, so that each brush power supply terminal 14 is formed into a L-shape. Base ends 15 of the terminals of the motor-side connector 11 project from the connector-side holding surface 12b. The base ends 15 of the terminals of the motor-side connector 11 project from the connector-side holding surface 12b in a direction, which is perpendicular to the axis L1 and is away from the motor-side connector 11. That is, the brush power supply terminals 14 and the base ends 15 of the terminals of the motor-side connector 11 are connected to the circuit board 13 in the direction perpendicular to the axis L1 of the rotatable shaft L1.

The circuit board 13 is rectangular-shaped and includes various electric circuit components 16, which form circuits for controlling the motor main body 2 (including a circuit for driving the motor main body 2 and/or a circuit for measuring information relevant to rotation of the rotatable shaft 7, such as a rotational speed of the rotatable shaft 7, a rotational direction of the rotatable shaft 7). The electric circuit components 16 include, for example, a control integrated circuit (IC), a relay, a capacitor and/or a Hall element used for obtaining the information relevant to rotation of the rotatable shaft 7.

The circuit board 13 includes brush-side connection terminals 17 and connector-side connection terminals 18. The brush-side connection terminals 17 are connected to the brush power supply terminals 14. The connector-side connection terminals 18 are connected to the base ends 15 of the terminals of the motor-side connector 11. These terminals 17, 18 are female type terminals, and the brush power supply terminals 14 and the base ends 15 of the terminals of the motor-side connector 11 are male type terminals, which are received in the female type terminals, respectively. Alternatively, the terminals 17, 18 can be made as male type terminals, and the brush power supply terminals 14 and the base ends 15 of the terminals of the motor-side connector 11 can be made as female type terminals, if desired. The terminals 17, 18 are connected to the brush power supply terminals 14 and the base ends 15 of the terminals of the motor-side connector 11, respectively, in the direction perpendicular to the axis L1 of the rotatable shaft 7. The circuit board 13 is installed to the circuit board holding portion 12 of the brush holder 10 in the direction perpendicular to the axis L1 of the rotatable shaft 7, so that the brush-side connection terminals 17 are connected to the brush power supply terminals 14, and the connector-side connection terminals 18 are connected to the base ends 15 of the terminals of the motor-side connector 11. In this way, the motor-side connector 11 is electrically connected to the motor main body 2 through the circuit board 13.

The speed reducing unit 3 includes a gear housing 20, which is made of a resin material and is formed into a predetermined shape. The gear housing 20 is connected to or assembled to the yoke housing 4 (i.e., the motor main body 2) by screws 21. The gear housing 20 includes a shaft receiving portion 20a. The shaft receiving portion 20a rotatably receives a worm shaft (not shown), which is connected to the rotatable shaft 7. The gear housing 20 also includes a generally circular wheel receiving portion 20b, which is located on one side of the shaft receiving portion 20a that is opposite from the motor-side connector 11. The wheel receiving portion 20b rotatably receives a worm wheel 22, which constitutes a part of the speed reducing mechanism. The worm wheel 22 is meshed with the worm shaft and reduces rotational speed of the worm shaft, so that the worm wheel 22 conducts the rotation of the worm shaft to an output shaft 23, which is secured to the center of the worm wheel 22. The output shaft 23 is connected to a window regulator, which raises and lowers a vehicle window glass.

The gear housing 20 also includes a circuit board receiving portion 20c. The circuit board receiving portion 20c is formed into a generally rectangular shape, which extends in a direction parallel to the axis L1 of the rotatable shaft 7 on the other side (i.e., the connector 11 side) of the shaft receiving portion 20a, which is opposite from the worm wheel receiving portion 20b. The circuit board receiving portion 20c receives the circuit board 13 such that the plane of the circuit board 13 is parallel to a flat direction (i.e., the direction parallel to the plane of FIG. 1 or 2) of the gear housing 20 (more specifically, the wheel receiving portion 20b). That is, the circuit board 13 is received in the circuit board receiving portion 20c to extend in the direction, which is parallel to the axis L1 of the rotatable shaft 7 and is also parallel to the flat direction of the gear housing 20 (more specifically, the wheel receiving portion 20b). In other words, the plane of the circuit board 13 is perpendicular to an axial direction of the output shaft 23. An end opening of the circuit board receiving portion 20c, through which the circuit board 13 is inserted into the circuit board receiving portion 20c, opens toward the motor main body 2 and also serves as an opening 20d, which is used to insert the rotatable shaft 7 projected from the motor main body 2 into the gear housing 20. The opening 20d is closed by the motor main body 2 (more specifically, the yoke housing 4) after the circuit board 13 is received in the gear housing 20. A lateral opening 20e is formed in a lateral side of the circuit board receiving portion 20c such that the lateral opening 20e is connected to the opening 20d. The motor-side connector 11, which is formed integrally with the brush holder 10, projects outwardly from the housings 4, 20 through the lateral opening 20e.

Advantages of the motor 1 according to the present embodiment will be described.

(1) In the present embodiment, the brush holder 10 is positioned at the gear housing 20 side of the motor main body 2. The brush holder 10 holds the brushes 9 and includes the motor-side connector 11 integrated therewith. The circuit board 13 is installed to the brush holder 10 in the direction perpendicular to the axis L1 of the rotatable shaft 7 of the motor main body 2 to electrically connect between the motor-side connector 11 and the brushes 9 and is received in the circuit board receiving portion 20c of the gear housing 20 when the motor main body 2 is assembled to the gear housing 20 (i.e., the speed reducing unit 3). Thus, when the connecting direction (inserting direction) of the motor-side connector 11 relative to the external connector needs to be changed due to a change in the design specification, it is not required to substantially change the components other than the motor-side connector 11, thus imposing no substantial influence on the arrangement of the components (e.g., the worm wheel 22 and the worm) received in the gear housing 20. As a result, it is relatively easy to meet a demand for such a modification, allowing minimization of the manufacturing costs of the motor 1. Furthermore, since the brush holder 10 is arranged at the gear housing 20 side of the motor main body 2, the motor-side connector 11 is arranged to be exposed outwardly between the motor main body 2 and the gear housing 20. That is, the motor-side connector 11 is arranged to project in the radial direction of the motor 1, i.e., in the direction perpendicular to the axis L1 of the rotatable shaft 7. Therefore, when the circuit board 13 is designed to be installed to the brush holder 10 in the direction perpendicular to the axis L1 of the rotatable shaft 7, the brush-side connection terminals 17 can be easily connected to the brush power supply terminals 14, and the connector-side connection terminals 18 can be also easily connected to the base ends 15 of the terminals of the motor-side connector 11. This allows easy installation of the circuit board 13. Also, when the circuit board 13 is designed to be installed to the brush holder 10 in the direction perpendicular to the axis L1 of the rotatable shaft 7, it is not required to unnecessarily bend the base ends 15 of the terminals of the motor-side connector 11. Since the number of the terminals of the motor-side connector 11 is relatively large, this arrangement can avoid complication of the structure of the base ends 15 of the terminals of the motor-side connector 11.

(2) In the present embodiment, the circuit board 13 is arranged such that the plane of the circuit board 13 is parallel to the axis L1 of the rotatable shaft 7. Thus, it is possible to limit an increase in the size of the circuit board receiving portion 20c (i.e., the size of the gear housing 20) in the direction perpendicular to the axis L1 of the rotatable shaft 7, and thereby it is possible to limit an increase in the total size of the motor 1.

(3) In the present embodiment, the circuit board 13 is arranged such that the plane of the circuit board 13 is parallel to the flat direction of the gear housing 20 (wheel receiving portion 20b). In other words, the plane of the circuit board 13 is perpendicular to the rotational axis of the output shaft 23. Thus, it is possible to limit an increase in the size of the circuit board receiving portion 20c (i.e., the size of the gear housing 20) in the direction perpendicular to the flat direction of the gear housing 20, and thereby it is possible to limit an increase in the total size of the motor 1.

(Second Embodiment)

A second embodiment of the present invention will be described with reference to the accompanying drawings. Similar components of an electric motor 1a of the present embodiment, which are similar to the components of the motor 1 of the first embodiment, will be indicated by the same numerals.

Figure 3:
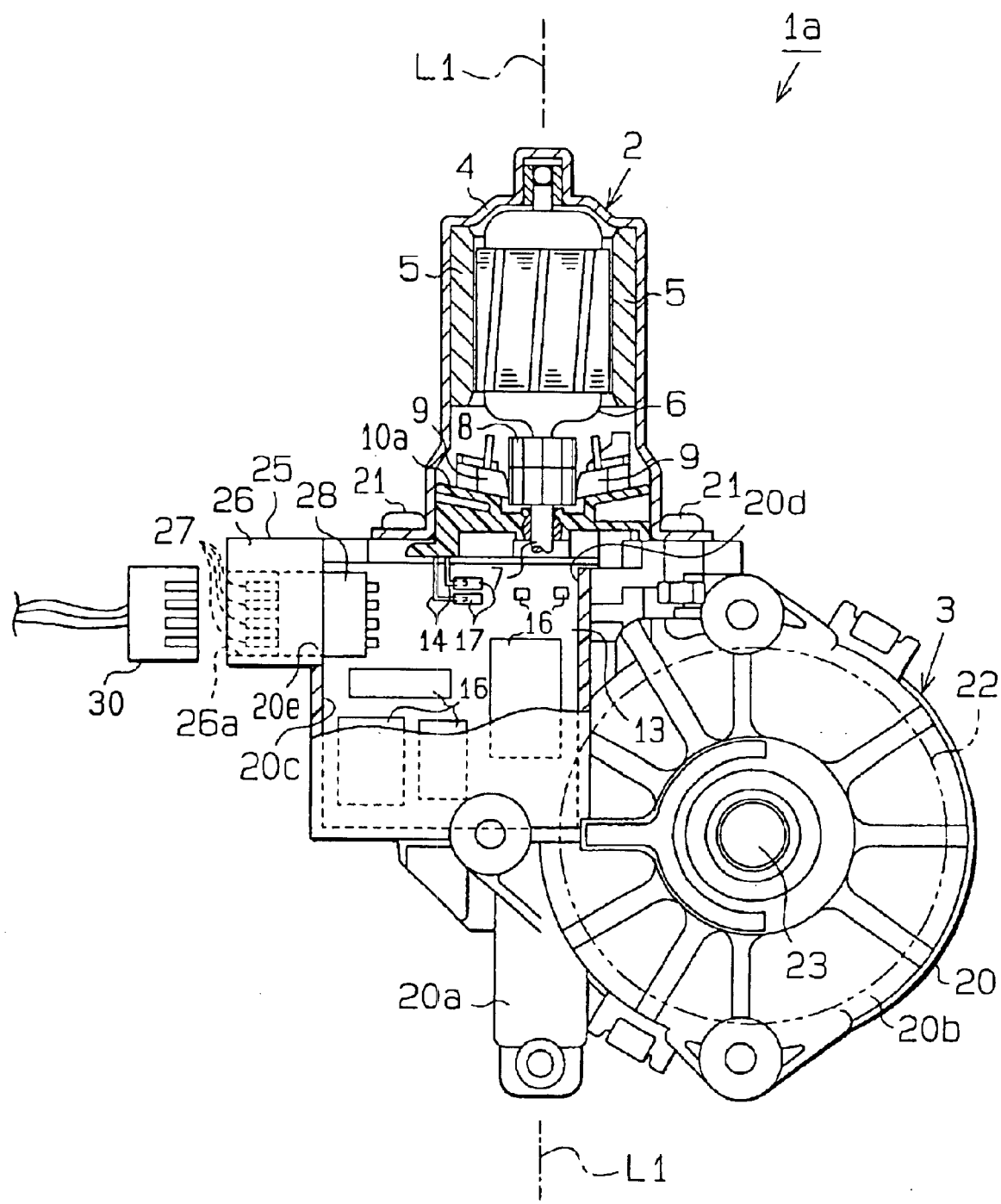
FIG. 3 is a partially fragmented frontal view of a motor according to a second embodiment of the present invention.
Figure 4:
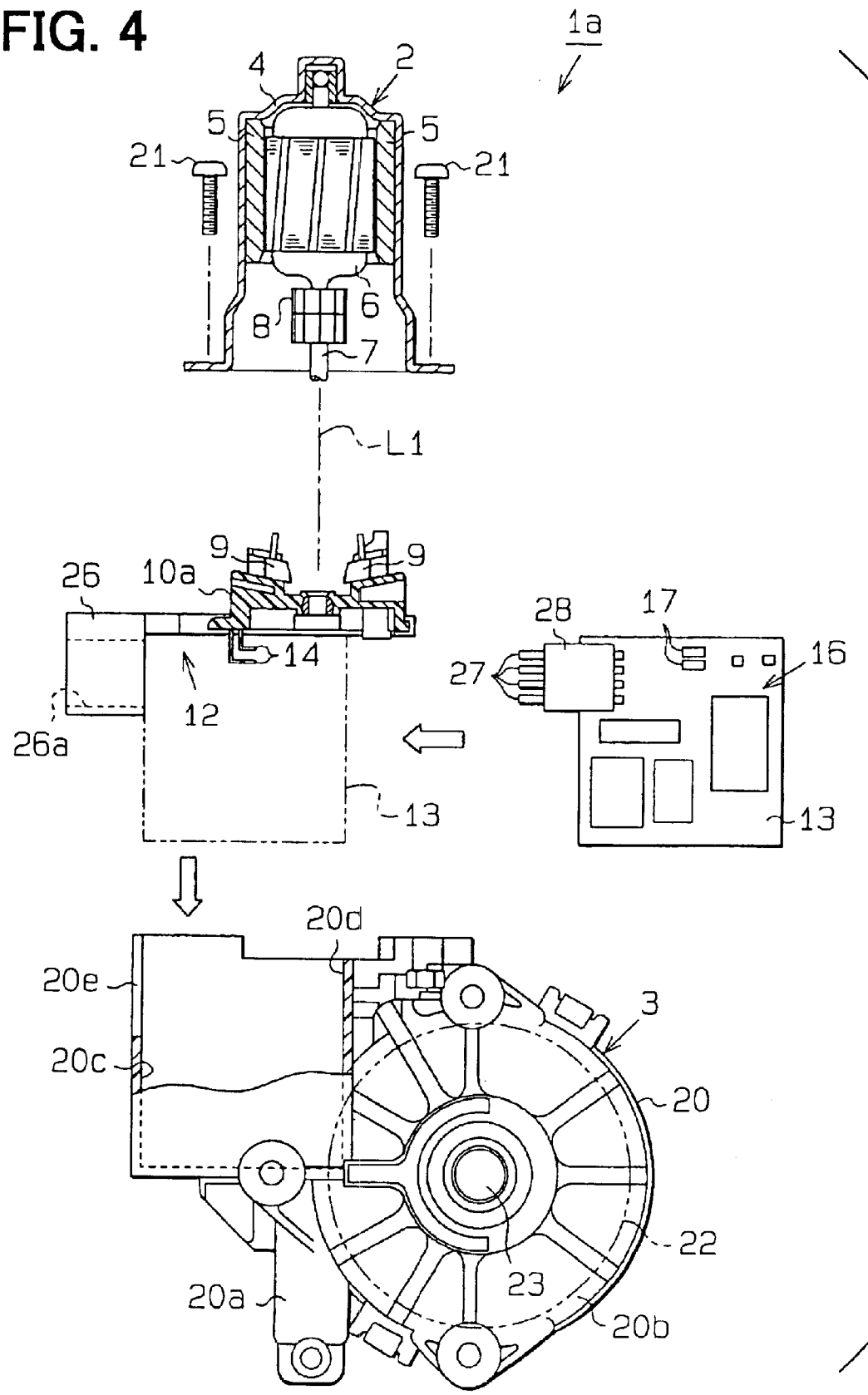
FIG. 4 is a partially fragmented and exploded frontal view of the motor of the second embodiment.

FIGS. 3 and 4 show the motor 1a of the second embodiment. The motor 1a of the present embodiment differs from the motor 1 of the first embodiment only in the structure of a motor-side connector 25. More specifically, a generally rectangular connector case 26, which constitutes a part of the motor-side connector 25, is integrally formed with the brush holder 10a. The connector case 26 includes a receiving opening 26a, which extends through the connector case 26 in the direction perpendicular to the axis L1 of the rotatable shaft 7. A connector main body 28, to which terminals 27 of the motor-side connector 25 are secured, is arranged in the circuit board 13. The connector main body 28 is inserted into the receiving hole 26a of the connector case 26. The circuit board 13 is installed to the brush holder 10a in the direction perpendicular to the axis L1 of the rotatable shaft 7, and thereby the connector main body 28 is inserted into the connector case 26 to form the motor-side connector 25.

Even with this arrangement, when the connecting direction (i.e., the inserting direction) of the motor-side connector 25 relative to an external connector 30 needs to be changed due to a change in the design specification, the components other than the connector main body 28 of the circuit board 13 and the connector case 26 of the brush holder 10a are not required to be modified substantially, and the arrangement of the components (e.g., the worm wheel 22 and the worm shaft) received in the gear housing 20 is not substantially affected by the change of the connecting direction of the motor-side connector 25. Thus, it is easy to meet a demand for such a modification, and it is possible to minimize the manufacturing costs of the motor 1a. Furthermore, the brush holder 10a is arranged at the gear housing 20 side of the motor main body 2, so that the connector case 26 is arranged to be exposed outwardly between the motor main body 2 and the gear housing 20. That is, the connector case 26 is arranged to extend in the radial direction of the motor 1a, i.e., in the direction perpendicular to the axis L1 of the rotatable shaft 7. Thus, as in the present embodiment, when the circuit board 13 is constructed to be installed to the brush holder 10a in the direction perpendicular to the axis L1 of the rotatable shaft 7, the installation of the circuit board 13 is eased.

The above embodiments of the present invention can be modified as follows.

In the above embodiments, the circuit board 13 is arranged such that the plane of the circuit board 13 extends in the direction, which is parallel to the axis L1 of the rotatable shaft 7 and is also parallel to the flat direction of the gear housing 20 (more specifically, the wheel receiving portion 20b). However, the present embodiment is not limited to this. For example, the circuit board 13 can be arranged such that the plane of the circuit board 13 extends in the direction, which is only parallel to the axis L1 of the rotatable shaft 7. Furthermore, the circuit board 13 can be arranged to extend in the direction, which is parallel to the flat direction of the gear housing 20 (more specifically, the wheel receiving portion 20b).

The connecting direction (i.e., the inserting direction) of the motor-side connector 11, 25 relative to the external connector of each of the above embodiments can be modified in any appropriate manner.

The structure of the motor 1, 1a (i.e., the motor main body 2 and the speed reducing unit 3) of each of the above embodiments can be modified in any appropriate manner. For example, the speed reducing mechanism can be constructed using components other than the worm wheel 22.

In each of the above embodiments, the present invention is embodied in the motor 1, 1a used as the drive source of the vehicle power window system. However, the present invention can be embodied in a motor of any other appropriate apparatuses.

Additional advantages and modifications will readily occur to those skilled in the art. The invention in its broader terms is therefore not limited to the specific details, representative apparatus, and illustrative examples shown and described.

What is claimed is:

1. An electric motor comprising:
   a motor main body that includes a rotatable shaft, which is rotated upon energization of the motor main body;
   a speed reducing unit that is connected to the motor main body and includes:
     a speed reducing mechanism that reduces rotational speed of the rotatable shaft; and
     a gear housing that receives the speed reducing mechanism; and
   a circuit board that is held in the gear housing and has a circuit, which controls rotation of the rotatable shaft of the motor main body, wherein:
   the gear housing includes a circuit board receiving portion, which opens toward the motor main body and receives the circuit board;
   the motor main body further includes a brush holder, which supports a plurality of power supply brushes and includes a motor-side connector to be connected with an external connector, wherein the motor-side connector is integrated into the brush holder;
   the circuit board is installed to the brush holder in a direction perpendicular to an axial direction of the rotatable shaft to electrically connect between the motor-side connector and the power supply brushes; and
   the circuit board is received in the circuit board receiving portion when the motor main body and the speed reducing unit are assembled together.

2. The motor according to claim 1, wherein a plane of the circuit board is parallel to the axial direction of the rotatable shaft.

3. The motor according to claim 1, further comprising an output shaft, which is connected to the speed reducing mechanism to output rotational force from the motor, wherein a plane of the circuit board is perpendicular to an axial direction of the output shaft.

4. The motor according to claim 1, wherein:
   the motor-side connector includes a plurality of terminals;
   the brush holder further includes a plurality of brush power supply terminals; and
   the circuit board further includes:
     a plurality of brush-side connection terminals, which are respectively connected to the brush power supply terminals in the direction perpendicular to the rotational axis of the rotatable shaft; and
     a plurality of connector-side connection terminals, which are respectively connected to the terminals of the motor-side connector in the direction perpendicular to the axial direction of the rotatable shaft.

5. The motor according to claim 4, wherein one of each brush power supply terminal and each brush-side connection terminal is formed as a male terminal, and the other one of each brush power supply terminal and each brush-side connection terminal is formed as a female terminal that receives the male terminal therein.

6. An electric motor comprising:
   a motor main body that includes a rotatable shaft, which is rotated upon energization of the motor main body;
   a speed reducing unit that is connected to the motor main body and includes:
     a speed reducing mechanism that reduces rotational speed of the rotatable shaft; and
     a gear housing that receives the speed reducing mechanism; and
   a circuit board that is held in the gear housing and has a circuit, which controls rotation of the rotatable shaft of the motor main body, wherein:
   the gear housing includes a circuit board receiving portion, which opens toward the motor main body and receives the circuit board;
   the motor main body further includes a brush holder, which supports a plurality of power supply brushes and includes a connector case, wherein the connector case is integrated into the brush holder;
   the circuit board includes a connector main body, which cooperates with the connector case of the brush holder to form a motor-side connector to be connected with an external connector;
   the circuit board is installed to the brush holder in a direction perpendicular to an axial direction of the rotatable shaft to electrically connect between the motor-side connector and the power supply brushes;
   the connector main body is inserted into the connector case in the direction perpendicular to the axial direction of the rotatable shaft to form the motor-side connector; and
   the circuit board is received in the circuit board receiving portion when the motor main body and the speed reducing unit are assembled together.

7. The motor according to claim 6, wherein a plane of the circuit board is parallel to the axial direction of the rotatable shaft.

8. The motor according to claim 6, further comprising an output shaft, which is connected to the speed reducing mechanism to output rotational force from the motor, wherein a plane of the circuit board is perpendicular to an axial direction of the output shaft.

9. The motor according to claim 6, wherein the connector main body includes a plurality of terminals to be connected with a plurality of terminals of the external connector.

* * * * *